Sept. 8, 1942.  J. D. BARR  2,295,196
EMERGENCY RELEASE FOR SPRING APPLIED BRAKES
Filed Sept. 16, 1940  2 Sheets-Sheet 1

INVENTOR.
John David Barr
BY

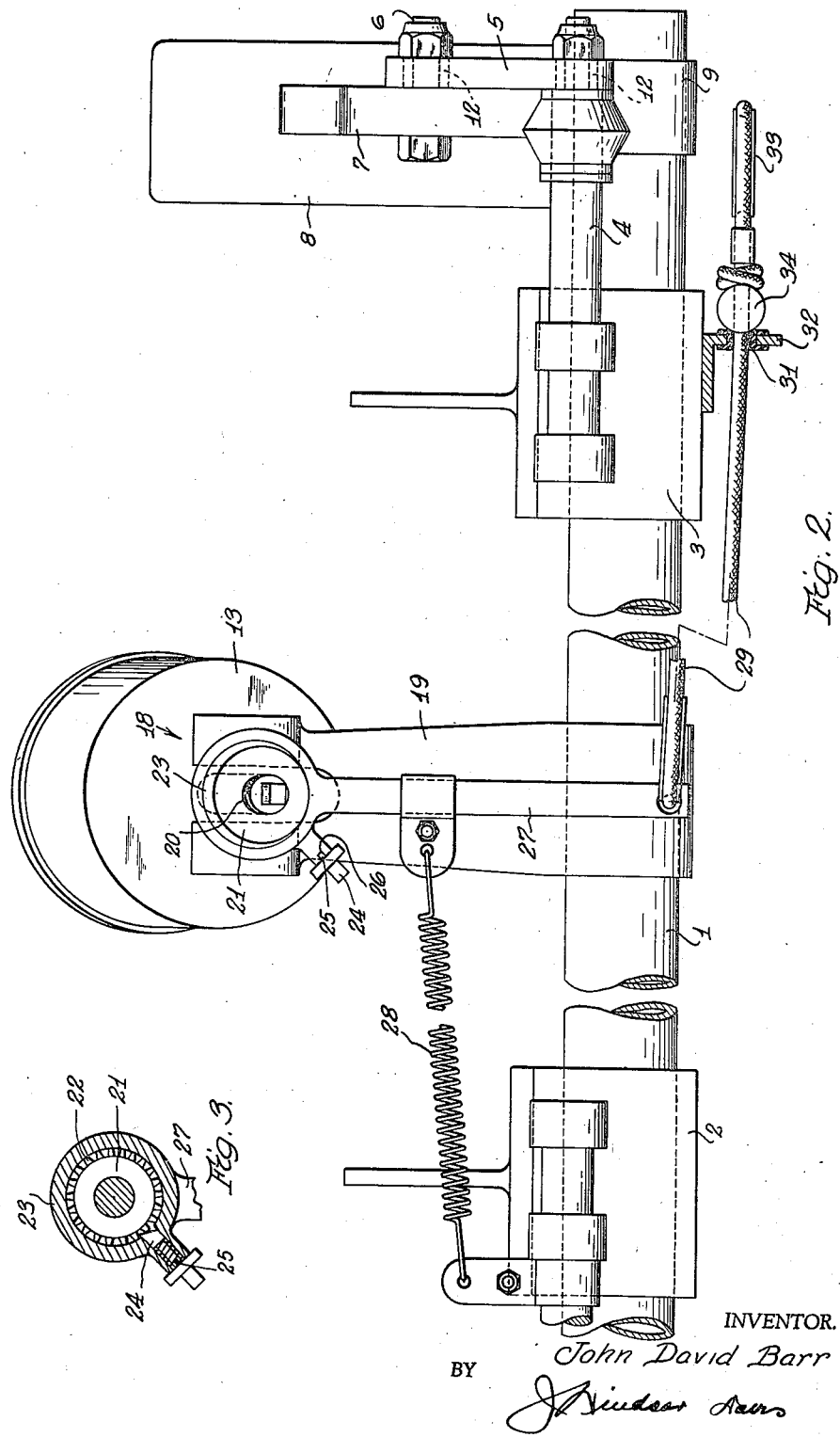

Patented Sept. 8, 1942

2,295,196

UNITED STATES PATENT OFFICE 2,295,196

EMERGENCY RELEASE FOR SPRING APPLIED BRAKES

John David Barr, Pittsburgh, Pa., assignor to Transit Research Corporation, a corporation of New York Application September 16, 1940, Serial No. 356,954

11 Claims. (Cl. 188—170)

This invention relates to brakes for street railway vehicles and has for its primary object to provide a convenient, readily operable means for manually releasing brakes of the type having self-applying means for operating the brakes under emergency conditions.

The brake system with which this invention is particularly concerned is of the type having springs for applying the brakes and fluid pressure means for releasing the brakes. This system is ordinarily preferred from the standpoint of safety, rather than a reverse system where the springs retract and the fluid pressure applies the brakes, for the reason that failure of the fluid pressure means automatically results in application of the brakes. When the brakes once become set under emergency conditions they must, of course, be released in order that the vehicle may be moved to a repair shop. This invention has for its main object to provide manually operable means readily accessible from the side of the vehicle for releasing the brakes.

The system here concerned includes brake shoes so supported that they may be moved into and out of contact with the wheels. The brake actuating means, for so moving the shoes, includes a lever connected by a piston rod to a piston slidably mounted in a cylinder. The piston is moved in a brake applying direction by a spring, and in a brake retracting direction by fluid under sufficient pressure to compress the spring. This invention provides a novel connecting means between the brake actuating lever and the piston rod, which constitutes means for so altering the relationship of the piston rod and lever that the lever may be moved to a brake-off position while the piston is in a brake-on position.

Another and more specific object is to provide a connecting means of the type above referred to which may be operated manually from the side of the vehicle to alter the relationship of the brake actuating lever and the piston rod in the manner specified, and also to restore them to their original relationship when the fluid pressure supply means has been placed in proper operating condition again.

Other objects and advantages will become more fully apparent as reference is had to the accompanying drawings wherein my invention is illustrated, and in which—

Fig. 2 is a fragmental end elevation, and

Fig. 3 is a cross section of a detail.

Figure 1:
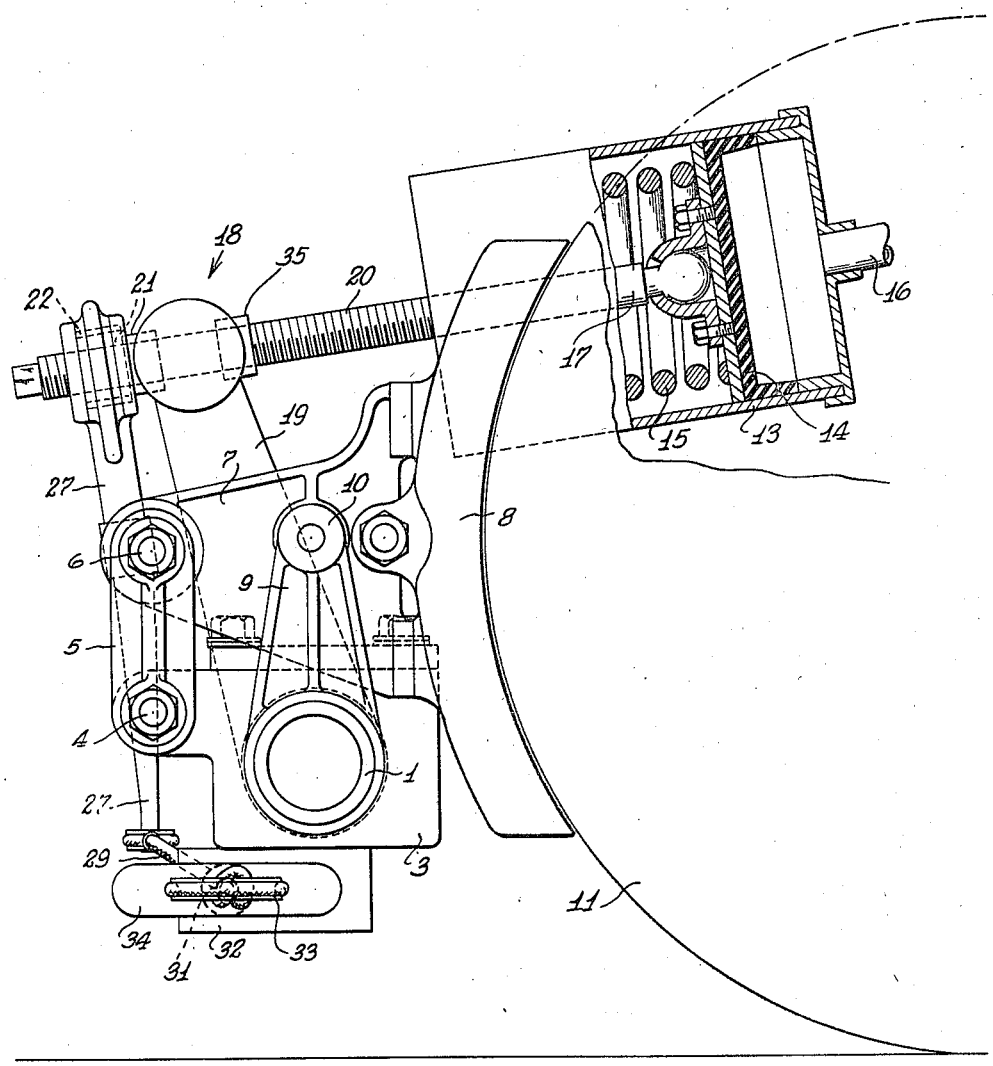
Fig. 1 is a side elevation of a brake assembly, with a part of the actuator cylinder broken away and in cross section.

More specifically, 1 designates a brake beam which is rotatably supported in bearings 2 and 3. The bearings 2 and 3 may be imagined as being supported on a rail vehicle truck, and that part of the beam which is broken away at the left hand side of Fig. 2 may be imagined as having a brake shoe assembly identical to that shown at the right hand side of Fig. 2 and also in Fig. 1.

Mounted upon the bearing 3 is a support 4 carrying a link 5. The link 5 is pivotally connected at 6 to a brake shoe lug 7 upon which the brake shoe 8 is mounted. An arm 9, rigidly mounted on the beam 1, is pivotally connected to the lug 7 at 10 so that rotative movement of the beam 1 in a clockwise direction (Fig. 1) will cause movement of the shoe into contact with the wheel indicated at 11. This assembly forms no essential part of the invention here concerned, and is intended to represent any special or conventional brake assembly. It is preferred, however, that a brake supporting member, the link 5 for example, be mounted on elastic bushings such as generally indicated at 12, which act in the absence of brake applying forces, to retract the shoe from engagement with the wheels.

Suitably mounted on the truck, by means not illustrated, is a cylinder 13 having a piston 14 therein. A spring 15 is mounted in the cylinder and urges movement of the piston in one direction, or to its brake-on position. The piston is adapted to be moved in the opposite direction, or to its brake-off position, by fluid pressure supplied through a line 16. Attached to the piston 14 is a rod 17 which is connected by means generally designated 18 to the free end of a lever 19, rigidly secured to the brake beam 1. The means 18 described more particularly hereinafter, is illustrated in a position enabling emergency release of the brakes, or, in other words, the piston 14 is in a brake-on position, where the brakes would ordinarily be applied, while the brake actuating lever 19 is in a brake-off position, where the brake shoe 8 is retracted from contact with the wheel 11.

The upper end of the lever 19 is forked, and straddles the screwthreaded portion 20 of the piston rod. On the screwthreaded portion 20 is a nut 21 which has ratchet teeth 22 encircled by a wrench body 23 having a spring pressed pawl 24. The pawl is designed to act in one direction only and is adapted to be manually rotated in order to change that direction. The pawl has a lug 25 adapted to engage in a notch 26 to prevent accidental turning thereof. As shown in Fig. 3, if the wrench handle 27 is swung back and forth the pawl will cause rotation of the nut 21 in a clockwise direction, whereas if the pawl is rotated through 180° similar movement of the wrench handle will cause rotation of the nut counterclockwise.

Connected to the bearing 2 and to the handle 27 is a spring 28 which normally acts to swing the handle in one direction. To manually swing the handle in the opposite direction a cable 29 is connected to the free end of the handle. The cable 29 extends outwardly laterally of the vehicle upon which the described assembly is mounted, and is trained through a rubber lined eye 31 in a bracket 32 attached to the bearing 3. On the outer end of the cable 29 is a rope thimble 33, in order that the cable may be conveniently grasped. The handle 27 is normally held in a substantially vertical position, against the pressure constantly exerted by the spring 28 by a wood handle 34, which is secured to the cable, and which engages the bracket 32 as shown.

As above mentioned, the parts are shown in a position with the brake released while the piston 14 is in its brake-on position. This represents the emergency release condition, where the fluid pressure supply has failed. This condition is made possible by counterclockwise rotation of the nut 21, to position it a greater distance from the piston than that in which it ordinarily is positioned to cause application of the brake shoe. If the fluid pressure supply is again placed in working order, the piston 14 will be moved toward the left hand side of Fig. 1, and the nut 21 will, of course, move away from the lever 19 a distance equal to the piston movement. The nut 21 is then rotated clockwise by oscillating the wrench handle 27 until the clearance between the nut 21 and the lever 19 has been taken up. A nut 35 may be placed upon the rod 20 to serve as a positioning abutment for the nut 21.

Although a specific embodiment of the invention has been illustrated and described, it will be understood that various changes may be made within the scope of the appended claims without departing from the spirit of the invention, and such changes are contemplated.

What is claimed is:

1. A brake assembly comprising a brake and a brake actuating member connected thereto and movable to a brake-on and a brake-off position, means for moving said member comprising a piston movable to brake-on and brake-off positions, means connecting said member to said piston in such manner that their positions normally coincide, said last named means being adjustable to an extent enabling positioning of said member in its brake-off position while the piston is in its brake-on position, and ratchet-like control means carried by said last named means as a permanent part thereof for causing adjustment of said connecting means.

2. A brake assembly comprising a brake and a brake lever connected thereto and movable to a brake-on and a brake-off position, means for moving said lever comprising a piston having a spring for causing movement thereof to a brake-on position and adapted to be moved by fluid pressure to a brake-off position, means connecting said lever and piston in such manner that their positions normally coincide, said last named means being adjustable to an extent enabling positioning of said lever in its brake-off position, while the piston is in its brake-on position, and ratchet-like control means carried by said last named means as a permanent part thereof for causing adjustment of said connecting means.

3. A brake assembly comprising a brake and a brake actuating member movable to a brake-on and a brake-off position, a piston movable to a brake-on and a brake-off position, a rod connected to said piston, said rod having a screwthreaded portion and an internally threaded abutment thereon, and a reversible ratchet-wrench permanently mounted on said abutment for causing rotation thereof.

4. A brake assembly comprising a brake and a brake actuating member movable to a brake-on and a brake-off position, a piston movable to a brake-on and a brake-off position, a rod connected to said piston, said rod having a screwthreaded portion and an internally threaded abutment thereon, and a reversible ratchet-wrench mounted on said abutment permanently for causing rotation thereof, a spring for oscillating said wrench in one direction, and an elongate cable for oscillating the wrench in the opposite direction.

5. A brake assembly comprising a brake and a brake actuating member movable to a brake-on and a brake-off position, a piston movable to a brake-on and a brake-off position, a rod connected to said piston, said rod having a screwthreaded portion and an internally threaded abutment thereon and adapted to engage said member, said abutment being normally positioned for engagement with said member to cause movement of said member to a brake-on position when said piston is moved to a brake-on position, and a reversible ratchet wrench permanently mounted on said abutment for rotating the same in reverse directions.

6. A brake assembly comprising a brake and a brake actuating member movable to a brake-on and a brake-off position, a piston movable to a brake-on and a brake-off position, a rod connected to said piston, said rod having a screwthreaded portion and an internally threaded abutment thereon and adapted to engage said member, said abutment being normally positioned for engagement with said member to cause movement of said member to a brake-on position when said piston is moved to a brake-on position, a reversible ratchet wrench permanently mounted on said abutment for rotating the same in reverse directions, a spring for oscillating said wrench in one direction, and an elongate cable for oscillating the wrench in the opposite direction.

7. A brake assembly comprising a brake and a brake actuating member movable to a brake-on and a brake-off position, a piston movable to a brake-on and a brake-off position, a rod connected to said piston, said rod having a screwthreaded portion and an internally threaded abutment thereon and adapted to engage said member, said abutment being normally positioned for engagement with said member to cause movement of said member to a brake-on position when said piston is moved to a brake-on position, said abutment being movable to a position enabling movement of said member to a brake-off position while said piston is in a brake-on position, and a reversible ratchet wrench permanently mounted on said abutment for rotating the same in reverse directions.

8. A brake assembly comprising a brake and a brake actuating member movable to a brake-on and a brake-off position, a piston movable to a brake-on and a brake-off position, a rod connected to said piston, said rod having a screwthreaded portion and an internally threaded abutment thereon and adapted to engage said member, said abutment being normally positioned for engagement with said member to cause movement of said member to a brake-on position when said piston is moved to a brake-on position, said abutment being movable to a position enabling movement of said member to a brake-off position while said piston is in a brake-on position, a reversible ratchet wrench permanently mounted on said abutment for rotating the same in reverse directions, a spring for oscillating said wrench in one direction, and an elongate cable for oscillating the wrench in the opposite direction.

9. In a brake system for a vehicle, in combination, a solid one piece brake cylinder lever, a brake cylinder device operative by fluid under pressure to effect the operation of said lever to brake release position and operative upon the venting of the actuating fluid pressure therefrom for effecting the operation of said lever to brake application position, and ratchet means associated with said brake cylinder device for effecting the operation of said lever to brake release position, said ratchet means being manually operative independently of the operation of the brake cylinder device to permit operation of said lever to effect a release of the brakes.

10. In a brake system, in combination, a rigid one piece brake cylinder lever, a brake cylinder device having a piston rod and a push rod for actuating said lever, said piston and push rod being responsive to a yielding constant pressure for actuating said lever to effect an application of the brakes and being responsive to fluid under pressure for actuating said lever to effect a release of the brakes, means mounted on said push rod and operative independently of the operation of said push rod for permitting actuating of said lever to effect a release of the brakes, and ratchet means manually operative for controlling said means.

11. In a brake system, in combination, a solid one piece brake cylinder level operative to effect either an application or a release of the brakes, a brake cylinder push rod screwthreaded at its outer end and operative for actuating said lever, a brake cylinder piston for actuating said push rod, said piston having at one side a chamber and responsive to fluid under pressure in said chamber for actuating said push rod to actuate said lever to effect a release of the brakes and responsive to a reduction in the pressure of fluid in said chamber for actuating said push rod to actuate said lever to effect an application of the brakes, a nut having screwthreaded engagement with said push rod and movable relative to said push rod in one direction for effecting actuation of said lever to release the brakes and movable relative to said push rod in the opposite direction for taking up slack in the brake rigging, and manually operative ratchet means for moving said nut in either direction relative to said push rod.

JOHN DAVID BARR.